(12) United States Patent
Klein et al.

(10) Patent No.: US 7,459,078 B2
(45) Date of Patent: Dec. 2, 2008

(54) FILTER DEVICE

(75) Inventors: Volkmar Klein, Zweibrücken (DE); Joel Daub, L'Hopital (FR)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 13 days.

(21) Appl. No.: 10/593,473

(22) PCT Filed: Mar. 3, 2005

(86) PCT No.: PCT/EP2005/002215

§ 371 (c)(1),
(2), (4) Date: Sep. 19, 2006

(87) PCT Pub. No.: WO2005/092472

PCT Pub. Date: Oct. 6, 2005

(65) Prior Publication Data

US 2007/0256965 A1    Nov. 8, 2007

(30) Foreign Application Priority Data

Mar. 20, 2004  (DE) .................. 10 2004 014 149

(51) Int. Cl.
*B01D 27/08* (2006.01)
*B01D 35/30* (2006.01)
*B01D 35/153* (2006.01)
*B01D 35/157* (2006.01)

(52) U.S. Cl. .............. 210/234; 210/235; 210/238; 210/443

(58) Field of Classification Search .......... 210/234, 210/235, 238, 443
See application file for complete search history.

(56) References Cited

U.S. PATENT DOCUMENTS

| 2,991,885 | A | * | 7/1961 | Gutkowski ............. 210/133 |
| 3,595,397 | A | * | 7/1971 | Abos ..................... 210/232 |
| 4,615,812 | A |   | 10/1986 | Darling |
| 5,601,710 | A | * | 2/1997 | Yoon et al. ............. 210/232 |
| 5,607,582 | A | * | 3/1997 | Yamazaki et al. ....... 210/234 |
| 5,753,111 | A | * | 5/1998 | Patton et al. ......... 210/167.01 |
| 5,826,854 | A |   | 10/1998 | Janvrin et al. |
| 6,579,455 | B1 | * | 6/2003 | Muzik et al. .......... 210/234 |
| 2002/0036162 | A1 |   | 3/2002 | Magnusson et al. |
| 2002/0185425 | A1 |   | 12/2002 | Bassett et al. |

FOREIGN PATENT DOCUMENTS

DE  697 17 003  12/1997

* cited by examiner

*Primary Examiner*—Thomas M Lithgow
(74) *Attorney, Agent, or Firm*—Roylance, Abrams, Berdo & Goodman, L.L.P.

(57) ABSTRACT

A filter device includes at least one filtering element arrangeable in a filter housing (11) connectable to a hydraulic device (9), in particular a hydraulic tank. The tank is connectable to the filter housing through hydraulic connections (37, 39) by a connection system in such a way that a fluid is enabled to circulate. The filter housing is removably mounted on the hydraulic device (9) by a fixing unit. The fixing unit is embodied in the form of a bayonet fitting (17, 19) which is lockable and detachable by the filter housing (11) rotation. The connection system has at least one movable locking element which locks in the locking position the hydraulic connection (37, 39) associated with it, and releases the connection after displacement in the open position. The locking element is displaceable in a sealing or opening position by rotational motions of the housing (11) for detaching and locking the bayonet fitting (17, 19).

8 Claims, 4 Drawing Sheets

FILTER DEVICE

FIELD OF THE INVENTION

The present invention relates to a filter device comprising at least one filter element which can be held in a filter housing connected to carry fluid by fluid connections to a fluid means, especially in the form of a hydraulic tank, via a connection system. The filter housing can be detachably fastened to the fluid means by a fastening means.

BACKGROUND OF THE INVENTION

Filter devices of this type are readily available on the market in a plurality of designs and versions. They are used, among other purposes, to filter dirt in fluids, such as hydraulic oil, out of these fluids. Hydraulic oil is fouled during installation and when the respective hydraulic system is started up. In addition to this initial fouling, fouling during operation can occur, for example, by penetration of dirt at the hydraulic tank due to inadequate tank ventilation, pipe penetrations, piston rod seals, and the like. To the extent fouling within the fluid stored in the hydraulic tank occurs in hydraulic systems of machines such as earth moving machines, excavators or the like, it can be advantageous to implement filtration directly in the region of the hydraulic tank, for example, by installing the filter device directly in the tank. The hydraulic oil is removed from the tank contents being delivered to filter out dirt directly to a filter element held in the filter housing. The fluid which has been cleaned in this way then returns again to the tank contents via the filter housing. In these solutions, the filter device cleans only the contents of the tank. Solutions are also conceivable in which the filter device delivers the correspondingly filtered and cleaned fluid to the hydraulic circuit of the machine, then returning to the tank the fluid fouled with solid particles in the circulation in the hydraulic circuit.

In the solutions in which the filter device filters only the contents of the tank by fluid being removed from the tank filtered and then returned again to the tank contents, it can be advantageous, when the filter element has to be changed to block off the contents of the fluid means, especially in the form of a hydraulic tank, relative to the filter housing. In this process, the filter housing with the used filter element can be completely dismounted from the fluid means, specifically the tank, and replaced by a filter housing with a fresh filter element without the need to interrupt operation of the respective hydraulic system.

In the known solutions, tedious and time-consuming measures must be carried out in conjunction with changing the filter housing. Thus, the pipes which belong to the connection system must be separated from one another and sealed tight in a complicated process. There is also the danger that larger amounts of fluid will escape from the filter housing and/or fluid means as a type of leaking oil flow when the filter housing is being dismounted. This leaking leads to environmental pollution problems. Moreover, the actuation of the fastening means by the operator when removing and re-attaching the filter device to the fluid means must be done carefully to ensure trouble-free operation of the fluid system.

SUMMARY OF THE INVENTION

An object of the present invention is to provide a filter device in which the measures to be carried out to change the filter element can be performed especially easily and safely, so that trouble-free operation of the fluid means is ensured.

According to the present invention, this object is basically achieved by a filter device where a bayonet catch is provided as the fastening means, by which the filter housing can be detachably fastened to the fluid means. By rotary motion of the filter housing when the bayonet catch is being locked and released, a blocking element can be controlled which blocks and clears the pertinent fluid connection. The filter can then be changed with a maximum of safety and especially simply and easily. This easy changing is achieved in that blocking and clearing of the fluid connection take place automatically when the filter housing is being mounted and dismounted. This operation in turn takes place in an especially simple and easy manner by releasing and locking the bayonet catch.

Based on use of a bayonet catch as the fastening means and of the automatic blocking of the fluid connections when the bayonet catch is released, all the actuation processes in conjunction with replacing a used filter element can be carried out in a few seconds. The filter housing containing the used filter element can be removed as a whole from the fluid means by releasing the bayonet catch without separate measures being necessary at the fluid connections of the fluid means. Likewise, the attachment of a filter housing containing an unused filter element is effected in a correspondingly short period of time by locking the bayonet catch, because the fluid connections are automatically cleared by the locking process.

In embodiments characterized by an especially simple and compact design, the blocking element is a rotary disk valve which is pivoted on the fluid means. In this configuration, the rotary motions which take place when the bayonet catch is actuated can be converted especially easily into the corresponding rotational-control motions of the rotary disk valve.

In especially advantageous embodiments, the filter housing has one valve each pretensioned into the closing position at the inlet opening through which the fluid enters the dirty side of the filter housing and at the outlet opening for filtered fluid. By protruding control lugs provided on the fluid connections of the fluid means, the spring-loaded blocking bodies of these valves can be moved automatically against the closing force into the open position, when the filter housing is mounted on the fluid means (specifically the tank). In these embodiments, when the filter housing is removed from the fluid means, the openings of the filter housing are automatically blocked without having to take precautions against unintentional escape of fluid from the filter housing. The filter housing can then be moved to another location to have the filter element changed elsewhere, and additional maintenance actions can still be undertaken.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
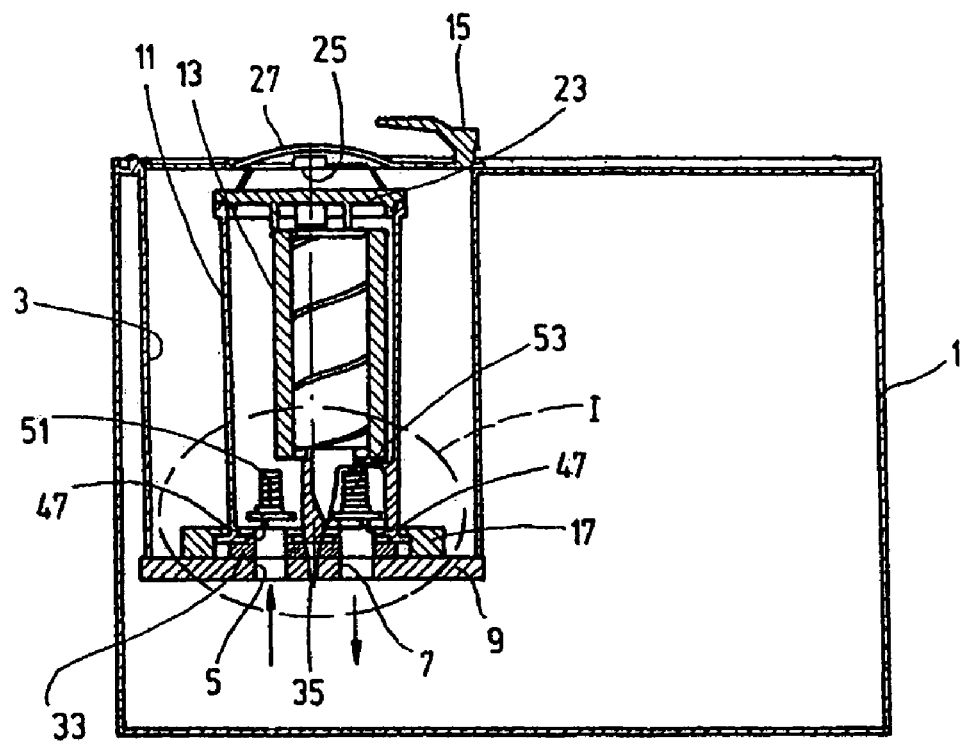
FIG. 1 is a side elevational view in section of a hydraulic tank with a filter device built into a tank compartment according to one embodiment of the present invention, the filter device being in the operating state.

FIGS. 1 to 4 show a fluid means in the form of a hydraulic tank 1 with a separate tank compartment 3 built into it and connected to the remaining tank contents simply by the fluid connections 5 and 7. Otherwise, tank compartment 3 is sealed relative to the remaining tank contents. The fluid connections 5 and 7 are located on the bottom-side end of the tank compartment 3, which end is formed by a flat connecting plate 9. The connecting plate 9 forms the carrier for the filter housing 11 of the filter device of the present invention, which filter housing can be attached to the plate by a detachable fastening device. For the filter housing 11 which is in the operating position and which is attached to the connecting plate 9, the fluid connection 5 forms the inlet for supply of the fluid to be cleaned to the dirty side in the interior of the filter housing 11. The outflow of cleaned fluid after it has passed through the filter element 13 in the filter housing takes place through the fluid connection 7.

Figure 2:
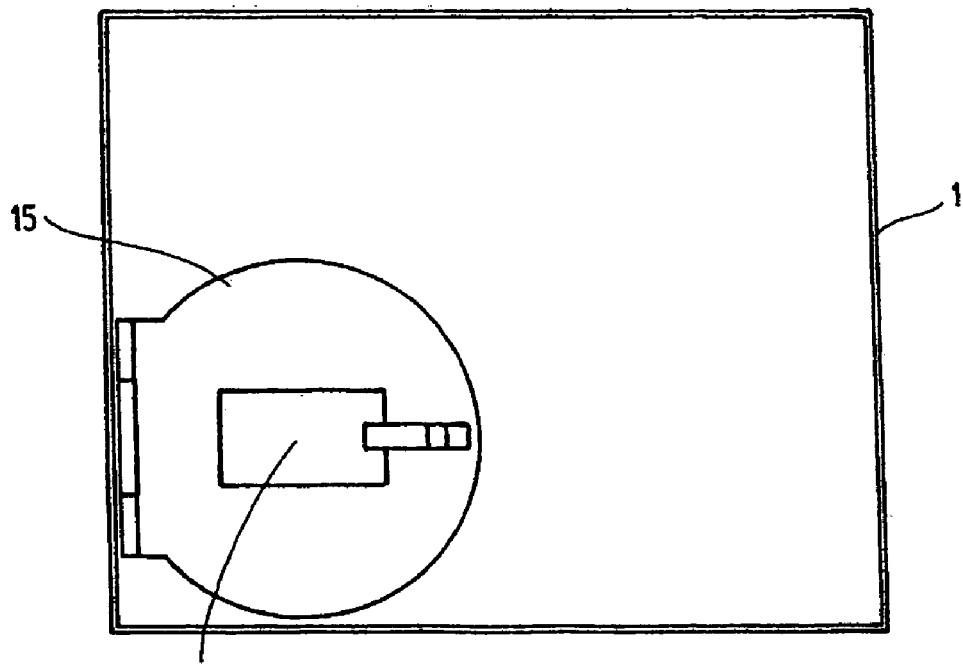
FIG. 2 is a top plan view of the hydraulic tank of FIG. 1.
Figure 3:
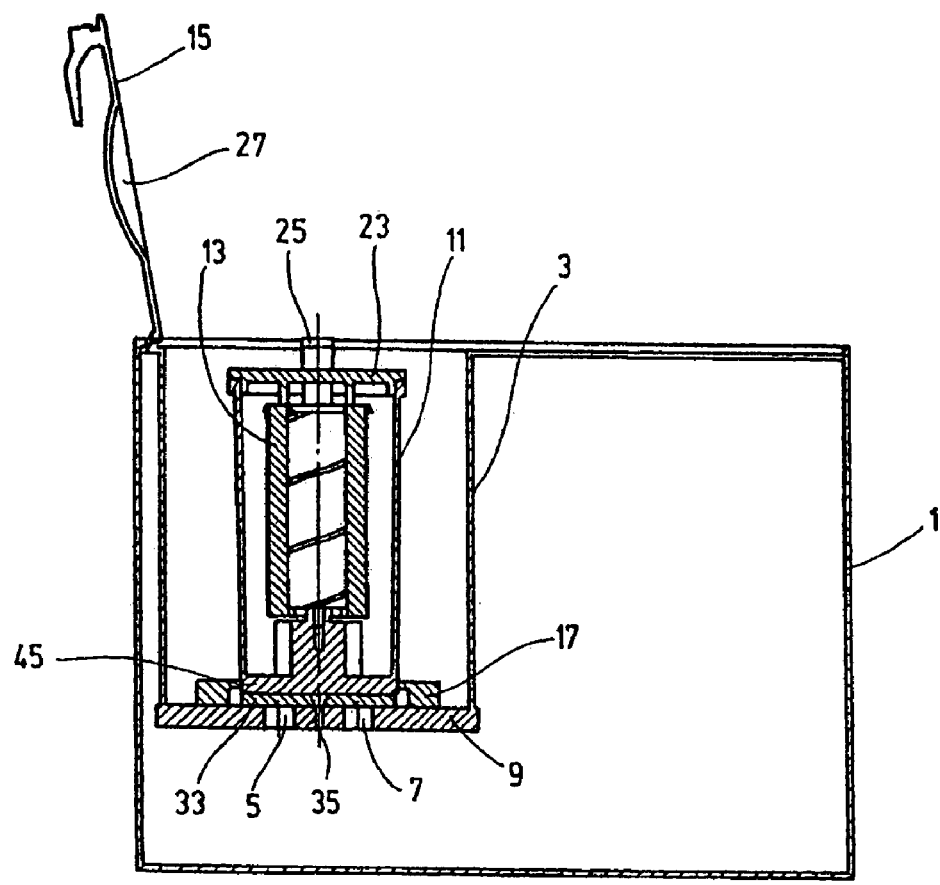
FIG. 3 is a side elevational view in section of the hydraulic tank of FIG. 1, with a tank cover enabling access to the tank compartment being opened for the filter device's removal from or installation in the tank compartment and with the filter device shown in a rotary position turned by 90° relative to FIG. 1.
Figure 4:
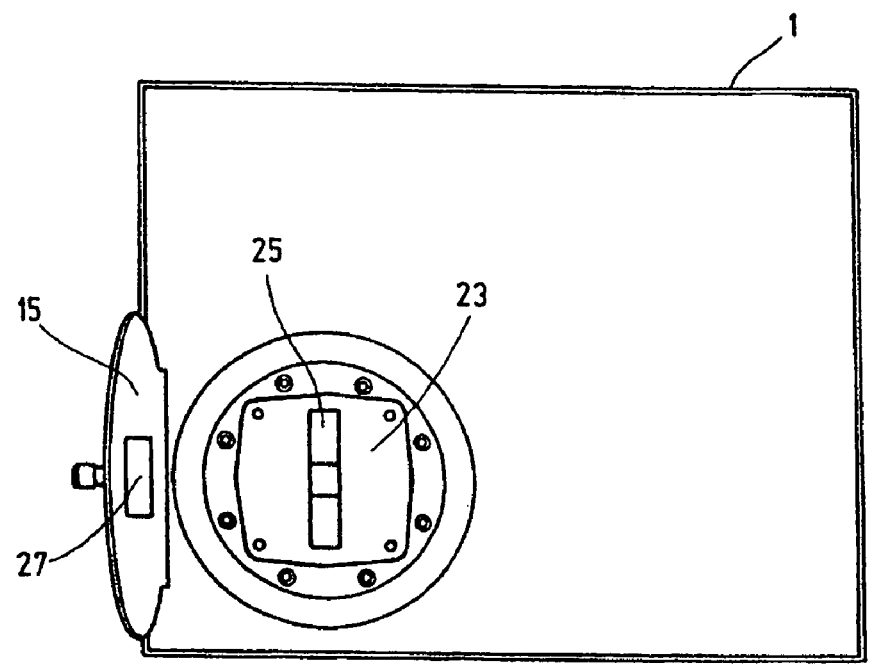
FIG. 4 is a top plan view of the tank of FIG. 3 which has an opened tank cover.
Figure 5:
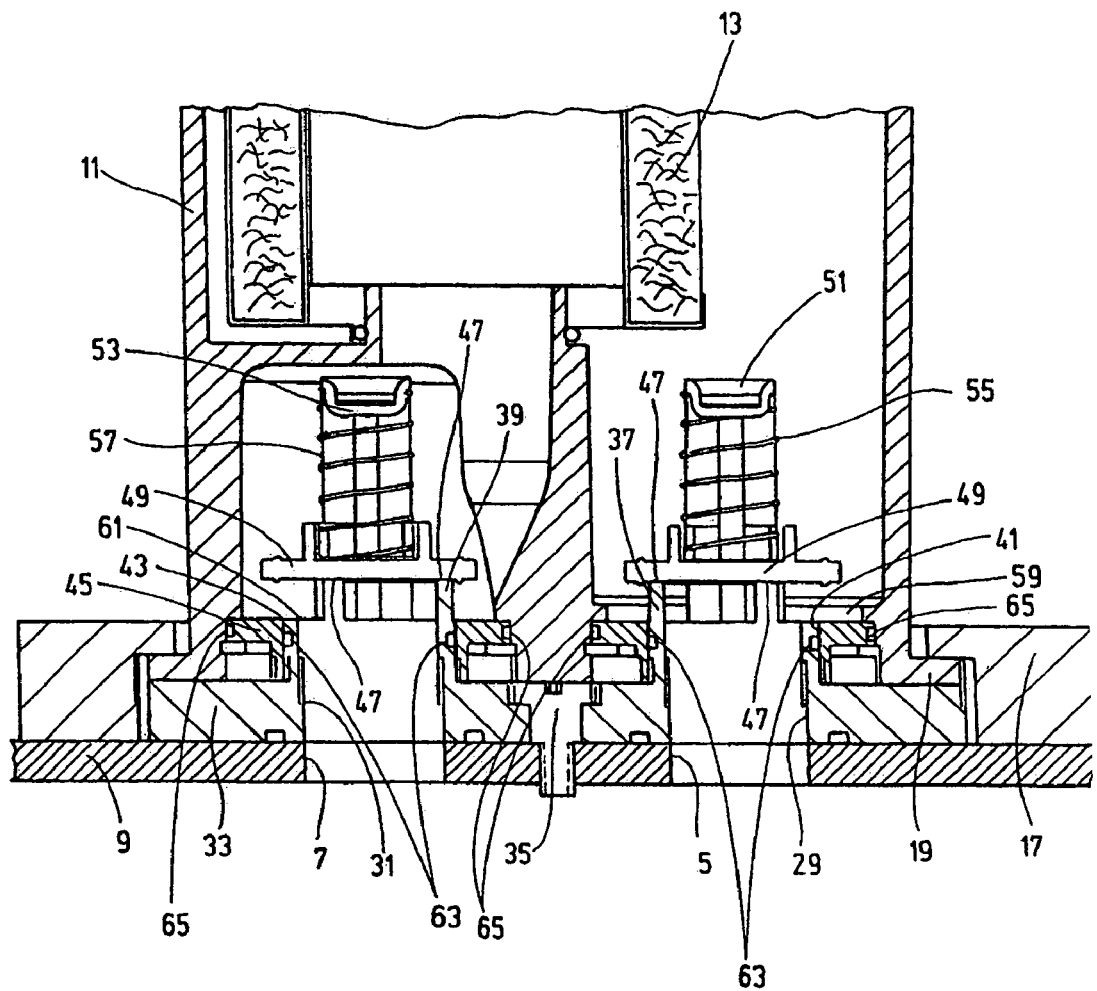
FIG. 5 is an enlarged, partial side elevational view in section of the area designated I in FIG. 1.
Figure 6:
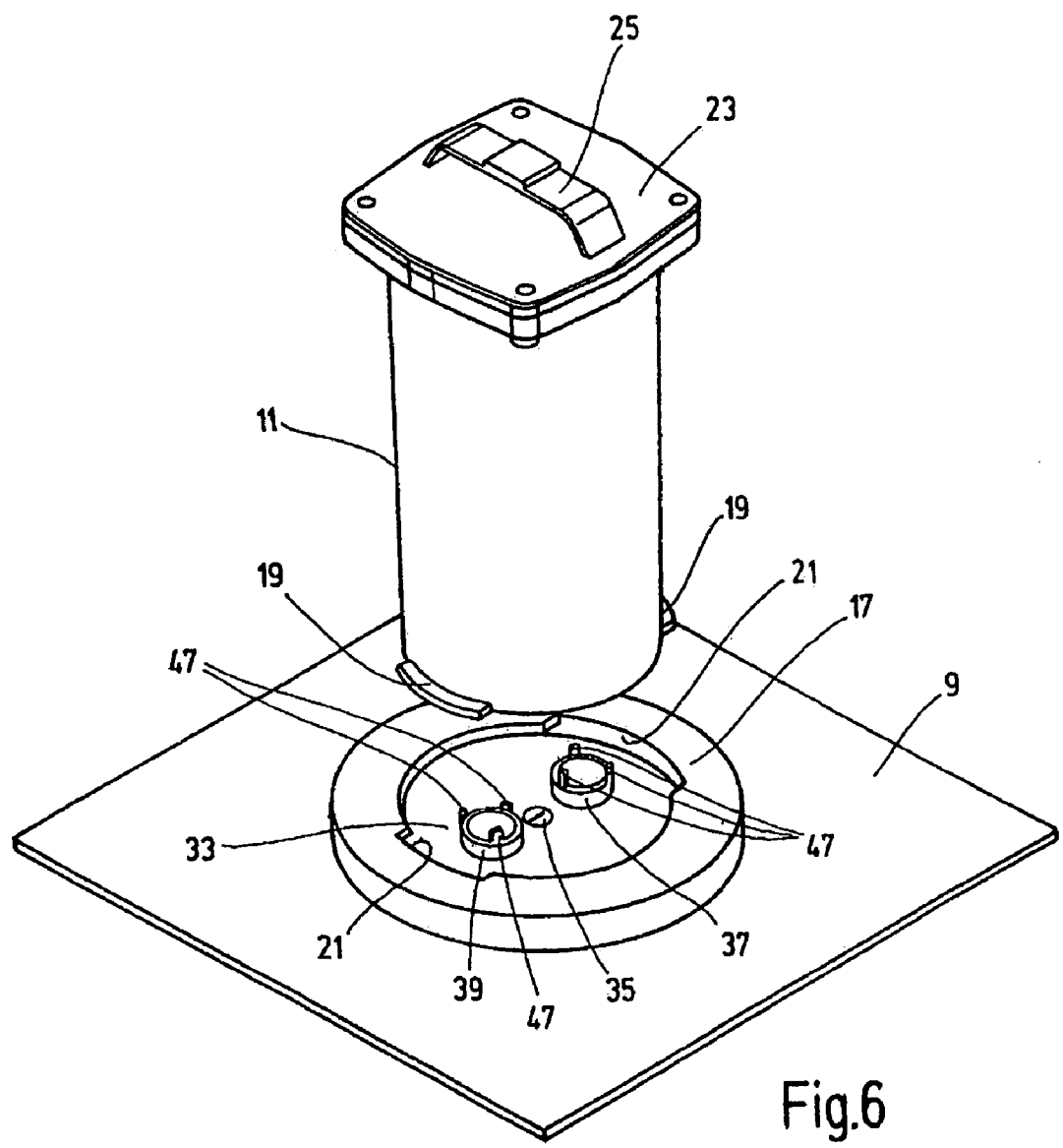
FIG. 6 is a perspective of the connecting plate of a fluid means (hydraulic tank) with the filter housing dismounted from the connecting plate and with the fastening device released.

FIGS. 1 and 2 show an operating state in which the filter device, with the tank cover 15 closed, is installed in the tank compartment 3. The filter housing 11 is located in the position corresponding to the operating state of the device. This operating state is shown more clearly in FIG. 5. The filter housing 11 is locked to the connecting plate 9 by a bayonet catch having a bayonet ring 17 attached to the connecting plate 9 (see also FIG. 6). Bayonet ring 17 interacts with the bayonet ribs 19 (FIGS. 5 and 6) diametrically opposite one another. The bayonet ribs radially project on an end edge of the filter housing. In the rotary position of the filter housing 11 shown in FIG. 6, the bayonet ribs 19 can be inserted into the bayonet guide of the bayonet ring 17 by recesses 21 (FIG. 6). By turning the filter housing 11 out of the rotary position shown in FIG. 6 by 90 angular degrees, the filter housing 11 is locked to the connecting plate 9 by the bayonet catch 17, 19. This rotary position which corresponds to the operating state of the filter device is shown in FIGS. 1 and 5. FIGS. 3 and 6 show the rotary position in which, with the bayonet catch released, the filter housing 11 can be lifted off the connecting plate 9. The filter housing 11 is closed on the end side by a cover part 23. A handle 25, designed for manual turning of the filter housing 11, extends axially away from the cover part 23 (to the top in the drawings). As a comparison of FIGS. 1 and 3 shows, the tank cover 15 can only be closed by the axial projection of the handle 25 in the rotary position of the filter housing 11 corresponding to the operating state when the bayonet catch is locked, specifically, when the corresponding section of the handle 25 extends along an arched recess 27 in the tank cover 15. If the filter housing 11 is in the rotary position shown in FIG. 3, where the projecting section of the handle 25 extends transversely to the recess 27, the tank cover 15 cannot be completely closed. In this manner, the operator is signaled by suitable means that the filter housing is not locked properly by the bayonet catch and the filter device is therefore not in its operating state.

As FIG. 5 shows most clearly, in this operating state, passages 29 and 31 of the rotary disk valve 33 are flush or coaxially aligned with the fluid connections 5 and 7. The rotary disk valve 33 is pivoted on the pin of a collar screw 35 screwed into the connecting plate 9. The rotary disk valve 33 has connecting sleeves 37 and 39 continuing the passages 29 and 31, respectively, into the interior of the filter housing 11 and penetrating the inlet opening 41 of the filter housing 11 and the outlet opening 43, respectively, of the filter housing 11. The inlet opening 41 through which dirty fluid enters the filter housing 11 and the outlet opening 43 through which cleaned fluid emerges form the filter housing 11 are located in the bottom part 45 of the filter housing 11. The bottom part 45 is sealed relative to the connecting sleeves 37, 39 by O rings (not shown) seated in annular grooves 63 and relative to the surrounding wall of the filter housing 11 by O rings (not shown) seated in annular grooves 65.

When the filter housing 11 is turned out of the operating position shown in FIGS. 1 and 5, the turning bottom part 45 entrains the connecting sleeves 37 and 39 of the rotary disk valve 33 acting as rotary drivers, so that it is turned and its openings 29, 31 become unaligned with or offset relative to the fluid connections 5 and 7. When the rotary position of the rotary disk valve 33 shown in FIG. 3 is reached, the fluid connections 5 and 7 are sealed by the rotary disk valve 33. In this position which is turned by 90° relative to FIGS. 1 and 5 and which is suggested in FIG. 6, the bayonet catch 17, 19 is released so that the filter housing 11 can be lifted. For the operating position shown in FIGS. 1 and 5, the control lugs 47 project on the end of the connecting sleeves 37 and 39 into the interior of the filter housing 11 to hold open the blocking bodies 49 of blocking valves 51 and 53 against the closing force of the respective closing springs 55 and 57. By lifting the filter housing 11, the blocking bodies 49 now are placed against the valve seats 59 and 61 by the closing springs 55, 57 to close the inlet opening 41 and the outlet opening 43 of the valve housing 11.

Thus, the filter housing 11, when it is dismounted from the connecting plate 9, is secured against escape of fluid, so that the filter housing 11, without the danger of environmental pollution by escaping leaking fluid, can be safely transported for replacement of the filter element or other maintenance. When a filter housing 11 containing an unused filter element 13 is moved onto the connecting plate 9 so that the bayonet ribs 19 enter the bayonet guide of the bayonet ring 17 through the recesses 21, the connecting sleeves 37, 39 of the rotary disk valve 33 penetrate the inlet opening 41 and the outlet opening 43 of the valve housing so that the projecting control lugs 47 unblock the blocking bodies 49 of the valves 51 and 53. If then the filter housing 11 is turned 90° for locking of the bayonet catch, the rotary disk valve 33 reaches the rotary position shown in FIGS. 1 and 5, so that in the course of attaching the filter housing 11 to the connecting plate 9 a fluid connection to the tank contents is automatically produced. On the other hand, when the filter housing is turned 90° to release the bayonet catch, the fluid connection to the tank contents is automatically blocked when the rotary disk valve 33 assumes the position shown in FIG. 3.

While one embodiment has been chosen to illustrate the invention, it will be understood by those skilled in the art that various changes and modifications can be made therein without departing from the scope of the invention as defined in the appended claims.

What is claimed is:

1. A filter device, comprising:
   at least one filter element having a dirty side;
   a filter housing receiving said filter element therein and having an inlet opening supplying contaminated fluid to said dirty side of said filter element and an outlet opening for flow of filtered fluid from said filter housing;
   a fluid container with fluid connections;
   a bayonet catch on said filter housing and said fluid container for releasably coupling and disengaging said filter housing and said fluid container by rotation of said filter housing relative to said fluid container;

a rotary disk valve pivotally mounted in said fluid container to open and close said fluid connections, said disk valve having inlet and outlet connecting sleeves forming extensions of said fluid connections, extending into an interior of said filter housing and transferring rotary motion of said filter housing to drive said rotary disk valve, said inlet and outlet connecting sleeves penetrating said inlet and outlet openings, respectively;

inlet and outlet valves at said inlet and outlet openings, respectively, said valves having blocking bodies movable between open positions allowing flow through said openings and closed positions blocking flow through said openings, said valves having closing springs biasing the blocking bodies thereof to the closed positions thereof; and inlet and outlet control lugs on said inlet and outlet connecting sleeves, respectively, projecting into said interior of said filter housing and directly contacting said blocking bodies of said inlet and outlet valves, respectively, when said filter housing is attached to said filter container to move said blocking bodies from said closed positions to said open position against biasing of said closing springs.

2. A filter device according to claim 1 wherein
said fluid container comprises a hydraulic tank.

3. A filter device according to claim 1 wherein
said filter housing mostly has a circular cylindrical shape;
a bottom part with said inlet and outlet opening therein closes an axial end of said filter housing connected to said fluid container;
a cover part seals an axial end of said filter housing opposite said bottom part; and
said bayonet catch comprises radially projecting bayonet ribs on a peripheral edge surrounding said bottom part and a bayonet ring, said bayonet ribs projecting diametrically opposite one another, said bayonet ring being attached to a connecting plate of said fluid container and surrounding said rotary disk valve, said rotary disk valve being pivoted on said connecting plate to open and close said fluid connections formed in said connecting plate.

4. A filter device according to claim 3 wherein
said connecting plate comprises a bottom of a tank compartment in said fluid container;
said tank compartment has a removable tank cover controlling access to said tank compartment, said filter housing being held in said tank compartment between said connecting plate and said tank cover; and
said fluid container comprises a hydraulic tank.

5. A filter device according to claim 4 wherein
said cover part comprises a handle projecting axially therefrom for rotating said housing and actuating said bayonet catch;
said tank cover is movable between a tank open position and a tank closed position, and comprises a recess receiving said handle when said tank cover is in said tank closed position only when said filter housing is in a rotary position corresponding to a locking position of said bayonet catch.

6. A filter device according to claim 1 wherein
said bayonet catch comprises bayonet ribs extending radially outwardly from a peripheral surface of said filter housing, and a bayonet ring in said fluid container receiving said filter housing and having inwardly opening bayonet recesses mating with said ribs.

7. A filter device according to claim 1 wherein
said inlet and outlet connecting sleeves extend into said inlet and outlet openings, respectively.

8. A filter device according to claim 2 wherein
said hydraulic tank comprises a tank compartment with bottom and side walls therein, said bottom wall supporting said rotary disk valve and having said fluid connections therein.

* * * * *